TYPICAL WAVE SHAPES GENERATED BY TONE SIGNAL SOURCE 202

INVENTOR.
BARRIE BRIGHTMAN
BY
George W. Killian
AGENT 3,066,193

TONE SELECTION CIRCUIT

Barrie Brightman, Webster, N.Y., assignor to General Dynamics Corporation, Rochester, N.Y., a corporation of Delaware Filed Apr. 7, 1961, Ser. No. 101,519
3 Claims. (Cl. 179—18)

This invention relates to an automatic communication system and, more particularly, to a new and improved means for coupling tone signals to a common communication channel in a time division multiplex switching system.

In the prior time division multiplex system shown in the copending application of Barrie Brightman, Serial No. 45,342, filed July 26, 1960, and which application is assigned to the same assignee as the present invention, there is shown a means for coupling the required supervisory and indicating tones to the common communication channel in appropriate time slots. Typical examples of the tones which may be required to be coupled to the common communication channel include the familiar dial tone, busy tone, and ringback tone. In addition, other tones, such as right of way, no such number, and out of order tones, may, from time to time, be required. Depending upon the requirements of the system, it may be desired to couple additional tones to the communication channel. In the system shown in the cited copending application, there is disclosed a plurality of tone generators each having an individual gate associated therewith which may be selectively enabled to couple the required tone to the highway during any required time slot. It is quite possible that a series of adjacent time slots within the time frame may require the same tone. Each time slot samples the required tone at a rate which is considerably larger than the frequency of the tone. Although not entirely accurate, it is convenient to think of each subscriber's line circuit as including a capacitor which, during the sampling period, is charged to a potential which is indicative of the instantaneous potential of the sampled tone. During the relatively long period between samples, the charged capacitor in the line circuit is discharged over the line. By repeating this process at a rapid rate, the subscriber connected to the line "hears" the sampled tone signal. When considered in this manner, it is immediately obvious that it is necessary for a relatively large amount of energy to be transferred to the line circuit capacitor in a very brief interval when it is remembered that there may be one hundred time slots in a time frame and that, therefore, the actual time allowed for the transfer of energy from the tone source to the line circuit capacitor is less than one percent of the time between successive samples. Furthermore, since adjacent time slots may require sampling of the same tone, it is necessary that the means which couples the tone to the common channel be designed to have sufficient power handling capacity to permit it to couple relatively large amounts of power to the highway in a series of adjacent time slots.

While the cited application discloses a system which is capable of providing the required features, it requires equipment with the amplifying and/or the energy handling capabilities outlined above for each tone which is to be coupled to the common communication channel.

Accordingly, one object of the present invention is to provide a new and improved time division multiplex switching system.

Another object is to provide a time division multiplex switching system including new and improved means for coupling supervisory and indicating tones to the common communication channel.

Another object of the invention is to provide a means for selectively coupling bursts of positive and negative signals to the common communication channel in a time division multiplex system for producing distinctive tones in selected time slots.

Another object of the invention is to couple selected signals to the common communication channel in selected time slots without requiring individual low impedance, high energy gating circuits fo reach different signal.

Other objects and advantages of the present invention will become apparent from a consideration of the following detailed description together with the drawings in which.

*General Description of a TDM System*

The present invention may be used in a time division multiplex system similar to that shown in the cited Brightman application or in other typical time division multiplex communication systems. A typical time division multiplex communication system includes a plurality of communication circuits that can be connected to a common signal transmission channel, or highway, through a plurality of signal responsive gates. These gates are opened and closed at distinct time positions in a repetitive time frame under the control of signals supplied thereto from a calling line store and a called line store in which are circulated, in coded form, the designations of the calling and called lines. Each of the time frames is divided into a plurality of distinct time slots. In general, all of the switching operations of the system are synchronized by a common pulse generator, or clock pulse source, that provides pulses at a predetermined frequency.

Figure 1:
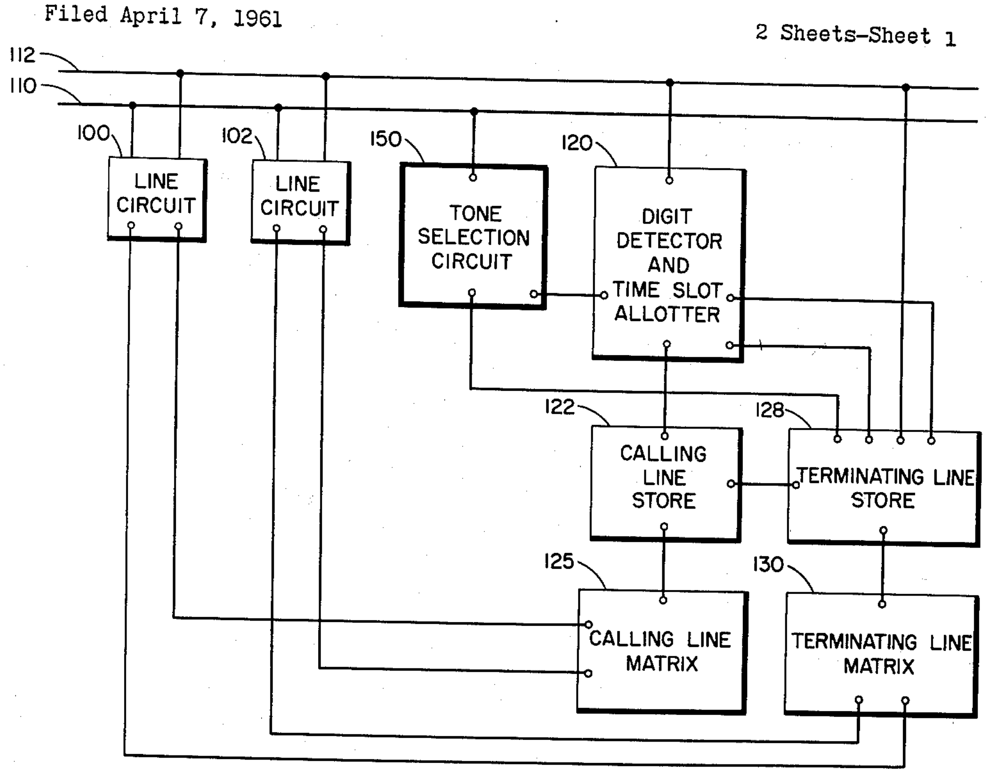
FIGURE 1 is a block diagram of the more essential elements in a typical time division multiplex communication system embodying the present invention.

The system shown in FIGURE 1 includes a plurality of line circuits 100 and 102 that can be coupled together for communication over a two-way speech highway 110 in any assigned one of the plurality of time slots. In addition, the line circuits 100 and 102 are connected together and to common equipment in the system over a line data highway 112. Each line circuit is provided with an individual designation. A number of separate communication channels can coexist on the highway 110 which is equal to the number of time slots in the repetitive time frame.

In order to determine whether one of the line circuits 100 and 102 is in a calling condition and requires the assignment of a time slot, the system includes a calling line store 122 having a ring counter continuously operable to successive settings, each representing one of the line circuits. A digit detector and time slot allotter circuit 120 continuously searches for and assigns idle time slots to the calling line store 122. When an idle time slot is received by the circuit 122, the counter is advanced and the idle or busy condition of the line circuit represented by the setting of the counter is determined. If the line circuit is busy, the counter is advanced one step to its next setting and the idle time slot is retained for subsequent use. If the line represented by the counter setting is idle, the counter setting is stored in a plurality of delay lines in the calling line store 122 that have a delay equal to one time frame. The counter setting is also applied to a calling line matrix 124. During the following time frame, the on-hook or off-hook condition of the line circuit whose designation is stored in the delay lines is determined.

The calling line matrix 124 translates the counter setting, or circuit designation, into the application of a signal in the assigned time slot to a matrix gate individual to the selected line. The time slot pulse from the matrix gate is supplied to the related line circuit and connects this line circuit to the highway in the allotted time position. If the circuit is in an on-hook condition, and thus does not present a calling condition, the assigned time slot is released for other use, the stored designation is cleared from the delay lines, and the selected circuit is disconnected from the highways 110 and 112. Alternatively, if an off-hook condition is presented, the time slot allotted to the calling circuit is stored in the busy time slot store to mark this slot as unavailable for use by other calling circuits, the stored designation is circulated in the delay lines in the assigned time position to continuously connect the selected circuit to the highways, and dial tone will be forwarded over the highway 110 in the assigned time slot in the manner to be more fully described below.

If the call is to be extended between a pair of line circuits, such as line circuits 100 and 102, the subscriber at the calling line circuit dials the digits necessary to extend the connection. Dialing the necessary digits causes the calling line circuit to supply a number of bursts of time slot pulses from the matrix 124 to the line data highway 112 in the time position assigned to the calling line circuit. The number of bursts of pulses correspond to the number of impulses in each individual digit. The values of the dialed digits are detected by counting circuits in the digit detector and time slot allotter 120 which are effective in the time position assigned to the calling line circuit and which count both the number of time slot pulses in the bursts and the number of clock pulses in the intervals between the bursts. This provides positively controlled means for separating dial impulses from spurious signals.

The values of the dialed digits are stored in delay line registers in a terminating line store 128 in the time position assigned to the calling line circuit. When the complete dialed designation has been stored in the terminating line store 128, this circuit determines whether the circuit represented by the dialed number is in an idle or busy condition. In addition, the delay line registers in the terminating line store 128 control translating circuits in a terminating line matrix 130 so that the called line circuit is connected to the highways 110 and 112 in the same time position as that allotted to the calling line circuit. This permits the terminating line store 128 to determine the on-hook or off-hook condition of the called line circuit. If the called line is busy, the terminating line store 128 provides a signal to the tone selection circuit 150 to request that the required busy tone be coupled to the highway 110 in the time slot assigned to the calling line, all in the manner to be more fully described below. Alternatively, if the called line circuit is idle, the terminating line store 128 provides a signal to the tone selection circuit 150 to request that ringback tone be coupled to the highway 110 in the time slot assigned to the calling line, all in the manner to be more fully described below, and, of course, in this case where the called line is idle, ringing signals will be coupled to the called line in a suitable manner, such as that shown in the cited copending application, or by the means shown in the copending application of Adam Jorgensen, Serial No. 90,412, filed February 20, 1961, and which application is assigned to the same assignee as the present invention.

Other functions and the details of the operation of these circuits, except for the tone selection circuit 150, may be obtained from an examination of the cited applications.

*General Description of Operation of Tone Selection Circuit 150*

When a line presenting a calling condition is connected to the common communication channel 110, which is commonly referred to as the highway, it is necessary to couple dial tone to the highway in the assigned time slot in order to advise the calling subscriber that the equipment is prepared for him to proceed to dial the designation of the desired called subscriber. The tone is caused to be coupled to the highway in the appropriate time slot by the tone selection circuit 150, which responds to a command signal from the digit detector and time slot allotter 120.

Subsequent to the completion of dialing, it is necessary to provide either a busy tone or ringback tone to the calling subscriber's line as an indication that the called line is busy or being rung, respectively, as the exigencies of the situation may require. These tones, like all tones, originate at the tone selection circuit and, in these cases, are caused to be coupled to the highway in the appropriate time slot in response to a command signal from the terminating line store 128. The command signal which it can be determined which tone is to be applied which it can be determinede which tone is to be applied and in which particular one of the plurality of time slots. The cited Brightman application shows means for generating command signals which are caused to open a selected gate to couple a selected amplified tone to the highway in the required time slot. Essentially the same command signals may be used in the present system, but instead of opening a gate for directly coupling the required tone to the highway, the command signal is gated in a manner to couple either a first or second low impedance, normally closed gate to the highway for coupling either a positive or negative signal to the highway depending upon the instantaneous potential of the signal representing the required tone. That is, a low impedance gate is provided which is caused to couple a relative high energy signal to the highway in response to a relatively low level command signal. Accordingly, bursts of positive and negative signals are coupled to the highway in the selected time slot wherein the potential of the individual signals comprising a burst is indicative of the instantaneous positive or negative character of the signal representing the tone to be coupled to the highway in the selected time slot.

Figure 2:
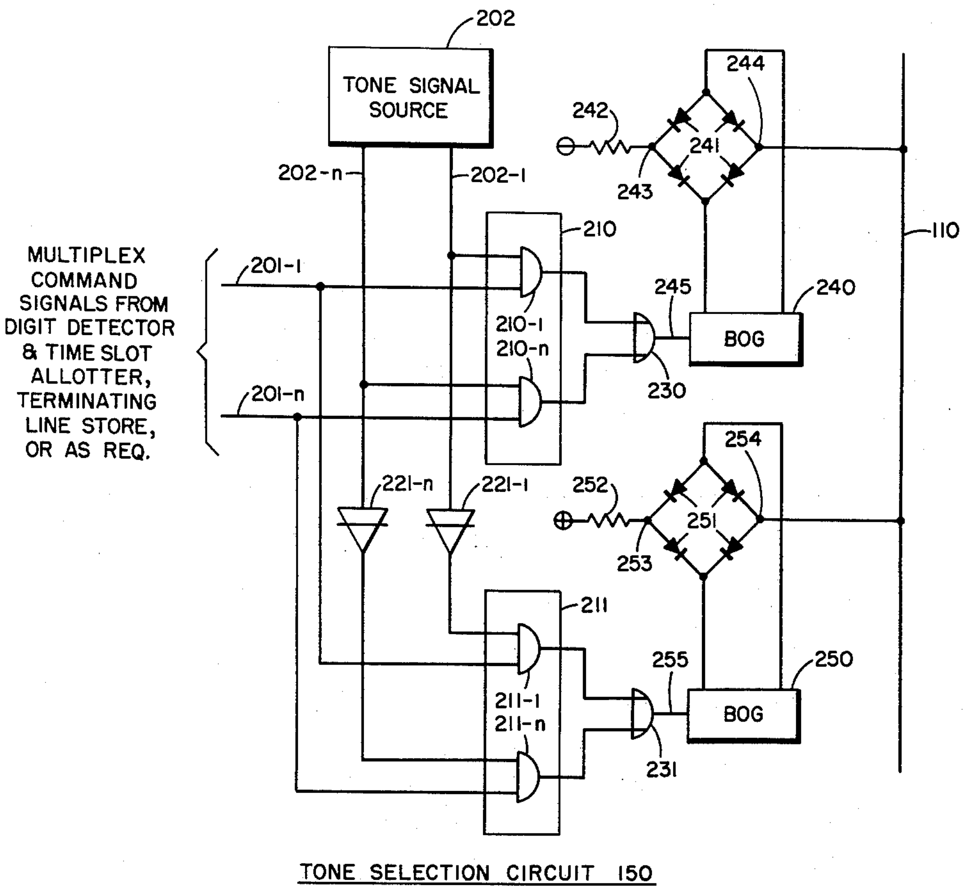
FIGURE 2 illustrates the invention in logic diagram form.

*Detailed Description of FIGURE 2*

FIGURE 2 is a logic symbol representation of the tone selection circuit 150 of FIGURE 1. It is believed that the use of conventional logic symbols reveals the invention more clearly and distinctly than would be possible if the actual components of each logic element were illustrated. Typical circuit diagrams for the various logic symbols used may be seen in the cited Brightman application and/or in the Pearce et al. Patent 2,933,564. The operation of FIGURE 2 may be appreciated after it is understood that logic symbols 210–1, **210–*n*, 211–1, and 211–*n* represent AND gates which produce a negative output signal at the right-side thereof only when both the input terminals at the left are at a negative potential. In a similar manner, logic symbols 230 and 231 represent OR gates which produce a negative output signal at the right-side thereof when any one or more of the input terminals at the left are at a negative potential. Logic symbols 221–1 and 221–*n* represent inverters which produce a negative output signal in response to a positive input signal, but not vice versa. Logic symbol 240 represents a blocking oscillator gate which is effective to provide a back bias on diodes 241, thereby presenting a high impedance between terminals 243 and 244 to prevent a transfer of energy therebetween. In response to a negative input pulse on lead 245, the blocking oscillator gate is caused to bias diodes 241 in the forward direction, thereby presenting a very low impedance between terminals 243 and 244 to permit a transfer of energy between terminals 243 and 244. The blocking oscillator gate is designed to bias the diodes 241 in the forward direction for a predetermined period of time irrespective to the duration of the input pulse. Since terminal 243 is connected to an independent power supply, a high energy power sample may be coupled to the highway each time that the diodes 241 are forward biased. Blocking oscillator gate 250 operates in a similar manner and parts thereof which correspond to similar parts in blocking oscillator gate 240** are given similar numbers in the 250 series.

Tone source 202 is a source of a plurality of square waves, each having a different pulse repetition rate. The square waves may be derived from the basic source of clock pulses or in any other convenient manner. Each square wave may, of course, be considered to comprise an infinite series of sine waves including a dominant fundamental wave. Each square wave is connected to an input of one AND gate in each of two sets. For example, conductor 201–1, which may be presumed to have a square wave with a pulse repetition rate of frequency *f*–1 connected thereto, is connected to AND gate 210–1 of the set 210 and to AND gate 211–1 of the set 211. In the illustrated embodiment of the invention, inverter 221–1 is used in order to permit the use of identical AND gates in the sets 210 and 211. However, if desired, the inverters in these leads could be eliminated and AND gates substituted for those in set 211 which respond to positive signals. In this case, inverters would be required in the conductors 201–1 to **201–*n* connecting to the AND gates in set 211**.

Negative multiplexing command signals are placed on selected ones of the leads 201–1 to **201–*n*** by the digit detector and time slot allotter, the terminating line store, or other circuits as may be required, to indicate that a signal corresponding to a predetermined square wave should be coupled to the highway in a predetermined time slot.

The signal coupled to the highway will be seen to be bursts of positive or negative signals in the required time slot. These bursts of positive or negative signals are coupled to the line circuit and natural filtering action of the line circuit transformer and other components reduces the bursts of positive and negative signals to a dominant sine wave together with various harmonics which, depending upon the pulse repetition rate of the original square wave, produces various and readily distinguishable tones.

Figure 3:
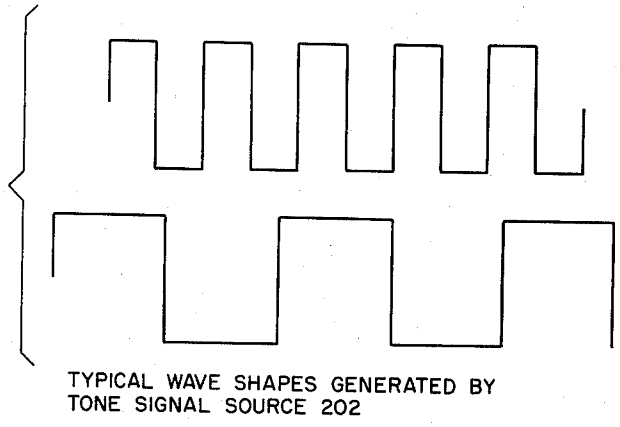
FIGURE 3 illustrates typical wave shapes generated by the tone source.

FIGURE 3 illustrates typical output wave forms of the tone generator means 202. If expedient, other wave shapes could be used. Of course, it is understood that the multiplexing signals are generated at a rate which is high relative to the pulse repetition rate of the highest frequency wave generated at tone source 202.

When it is desired to couple a particular tone signal to the highway in a particular time slot, a negative multiplexing pulse is applied to an appropriate one of the conductors 201–1 to **201–*n*. If it is assumed that the multiplexing signal is applied to conductor 201–1, it will be seen that AND gates 210–1 and 211–1 are partially enabled thereby. If two adjacent time slots require the same tone signal, the same conductor within the group 201 will receive two adjacent multiplexing signals. The multiplexing signals will be repeated in each time frame on the appropriate conductor as long as the tone is required to be coupled to the highway. With the appearance of the multiplexing pulse on conductor 201–1, either gate 210–1 or 211–1 will pass a negative signal depending upon the instantaneous positive or negative potential of the wave connected to lead 202–1. Thus, if the square wave has a negative potential, a negative pulse is passed through gate 210–1, while if the square wave has a positive potential, a negative pulse is passed through gate 211–1**.

When a negative pulse is passed through gate 210–1, it proceeds through OR gate 230 to blocking oscillator gate 240, while when a negative pulse is passed through gate 211–1, it proceeds through OR gate 231 to blocking oscillator gate 250. When blocking oscillator gate 240 is enabled, a negative signal through resistor 242 is coupled to the highway, while when blocking oscillator gate 250 is enabled, a positive signal through resistor 252 is coupled to the highway.

Accordingly, there is reproduced on the highway a signal indicative of the instantaneous potential of the selected tone signal at the time of sampling as determined by the multiplexing signal. Of course, if desired, the signal coupled to the highway may be made 180° out of phase with the sampled square wave by the simple expedient of reversing the potentials connected to resistors 242 and 252.

As may be required by the varying circumstances, the same or different tone signals may be coupled to the highway in various time slots with the use of only two low impedance, normally closed gates rather than one gate per tone, as has been required heretofore.

In certain situations, it may be expedient to produce a signal on the highway which is compounded from two or more square waves rather than from a single square wave. When two square waves are to be added together, two blocking oscillator gates, similar to gate 240, and two others, similar to gate 250, will be required; one pair for each of the square waves which are to be combined. To obtain the compound tone, two blocking oscillator gates are caused to be opened simultaneously by the multiplexing pulse. The two gates may provide either two negative signals, two positive signals, or one negative and one positive signal. In any case, the signals add. The additive effect is obtained by the use of resistors 242 and 252. Thus, if two positive signals are to be coupled to the highway in the same time slot, two resistors 252 are effectively placed in parallel and a correspondingly larger amount of energy may be transferred to the line circuit resonant transfer capacitor.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a time division multiplex system including a common communication channel, a tone selection circuit capable of selectively applying to said communication channel high power samples of any of a first plurality of tone signals in any of a selected second plurality of time slots, said circuit comprising first low impedance normally closed gate means coupled to said channel for applying a relatively positive potential thereto in response to the opening thereof, second low impedance normally closed gate means coupled to said channel for applying a relatively negative potential thereto in response to the opening thereof, and relatively high impedance control means coupled to said first and second gate means to control the opening thereof, said control means including generating means for simultaneously generating a first plurality of separate tone signals of different frequencies each of which has positive and negative portions, a set of conductors each of which individually corresponds to a separate tone signal, multiplex means coupled to said set of conductors for applying in any selected time slot a multiplex pulse to any selected one of said conductors in accordance with the tone signal to be selected, a set of first polarity sensitive sampling means each of which is coupled to an individual one of said conductors and each of which has the tone signal with which it corresponds applied thereto for producing an output therefrom only in response to said applied tone signal having one of said positive and negative portions thereof and the presence of a multiplexing pulse on said conductor coupled thereto, means for applying the outputs of said set of first polarity sensitive sampling means to said first gate means to effect the opening thereof, a set of second polarity sensitive sampling means each of which is coupled to an individual one of said conductors and each of which has the tone signal with which it corresponds applied thereto for producing an output therefrom only in response to said applied tone signal having the other of said positive and negative portions thereof and the presence of a multiplexing pulse on said conductor coupled thereto, and means for applying the outputs of said set of second polarity sensitive sampling means to said second gate means to effect the opening thereof.

2. The tone selection circuit defined in claim 1, wherein each of said tone signals is a square wave.

3. The tone selection circuit defined in claim 1, wherein said one of said positive and negative portions is positive and the other of said positive and negative portions is negative.

No references cited.

UNITED STATES PATENT OFFICE

CERTIFICATE OF CORRECTION

Patent No. 3,066,193 November 27, 1962

Barrie Brightman

It is hereby certified that error appears in the above numbered patent requiring correction and that the said Letters Patent should read as corrected below.

Column 2, line 7, for " fo reach" read -- for each --; column 4, line 14, after "signal" insert -- which requests a tone must include information from --; line 16, strike out "which it can be determinede which tone is to be applied"; line 30, for "relative" read -- relatively --; same column 4, line 72, for "to" read -- of --.

Signed and sealed this 14th day of May 1963.

(SEAL)
Attest:

ERNEST W. SWIDER
Attesting Officer

DAVID L. LADD
Commissioner of Patents